United States Patent [19]

Valsamis et al.

[11] 4,402,616

[45] Sep. 6, 1983

[54] ROTARY PROCESSORS

[75] Inventors: Lefteris N. Valsamis; Gary S. Donoian, both of West Haven, Conn.

[73] Assignee: USM Corporation, Farmington, Conn.

[21] Appl. No.: 336,929

[22] Filed: Jan. 4, 1982

[51] Int. Cl.³ .............................................. B29B 1/06
[52] U.S. Cl. ...................................... 366/99; 366/307
[58] Field of Search ...................... 366/69, 97, 98, 99, 366/307, 313, 315, 76; 251/324; 425/224, 466

[56] References Cited

U.S. PATENT DOCUMENTS

| | | | |
|---|---|---|---|
| 1,684,835 | 9/1928 | Larsen | 251/324 |
| 2,427,439 | 9/1947 | Brown | 251/324 |
| 2,970,802 | 2/1961 | Ocampo | 251/324 |
| 4,142,805 | 3/1979 | Tadmor | 366/97 |
| 4,213,709 | 7/1980 | Valsamis | 366/76 |
| 4,227,816 | 10/1980 | Hold et al. | 366/307 |

Primary Examiner—Philip R. Coe
Assistant Examiner—Thomas W. Epting
Attorney, Agent, or Firm—Frances J. P. Craig; John P. Morley

[57] ABSTRACT

A multi-stage rotary processor particularly useful for processing plastic and polymeric materials. The multi-stage rotary processor includes a rotatable element carrying a plurality of processing channels and a stationary element providing a coaxial closure surface cooperatively arranged with the channels to provide a plurality of enclosed processing passages. Also associated with the stationary element are inlets, outlets and blocking members for each passage and arranged so that material fed to the passage can be dragged forward by the channel walls, and collected at the blocking member for discharge from a passage(s) of one stage to a passage of another. The geometry of the passage receiving material is selected to provide optimum processing efficiency, resulting in a processing rate capability for that passage greater than the rate at which material is supplied to the passage. Adjustable material transfer rate control means are arranged near the inlet of the material receiving passage so that the processing rate of the passage can be adjusted for coordination with the rate at which material is supplied to the passage.

12 Claims, 8 Drawing Figures

ROTARY PROCESSORS

BACKGROUND OF THE INVENTION

(1) The Field of the Invention

This invention relates to processing apparatus. More precisely, this invention relates to multi-stage rotary processors particularly useful for processing plastic and polymeric materials.

(2) Description of the Prior Art

Rotary processors are known to the art. Details relating to such processors are described in U.S. Pat. Nos. 4,142,805; 4,194,841; 4,207,004; 4,213,709; 4,227,816; 4,255,059; 4,289,319; 4,300,842 and in commonly assigned, copending applications Ser. No. 190,465 filed Sept. 24, 1980 and U.S. Application Ser. No. 971,332 filed Dec. 20, 1978. All of the above patents and applications are incorporated here by reference.

Multi-stage rotary processors are also known to the art. U.S. Pat. No. 4,227,816 specifically relates to a rotary processor having two stages in three sections. Rotary processors of U.S. Pat. No. 4,227,816 comprise a rotatable element or rotor carrying a plurality of processing channels and a stationary element providing a coaxial closure surface cooperatively arranged with the channels to provide enclosed processing passages. Also associated with the stationary element are inlets, outlets and blocking members for each passage and material transfer passages or grooves formed in the closure surface of the stationary element and arranged to transfer material from a passage (or passages) of one stage to a passage (or passages) of another stage. As disclosed in U.S. Pat. No. 4,227,816, one processing stage involves two primary or supply sections. Each primary or supply section of the first stage is arranged at each end of the rotor and are separated from each other by a second processing stage adapted to receive material from each section of the first stage.

U.S. Pat. No. 4,213,709 also relates to a multi-stage rotary processor which provides two processing stages which include a primary processing passage interconnected to a further processing passage. The preferred processor involves two primary processing passages, each arranged at each end of the rotor with the primary processing passages separated by two further processing passages adapted to receive material from the primary processing passages. In the processors described in U.S. Pat. Nos. 4,213,709 and 4,227,816, the passages adapted to receive material from passages of another stage are of a selected geometry relative to the geometry of the passages from which the material is received. Essentially, the geometry is selected to provide the material receiving passage with the capability to process and discharge material at a volume rate which is less than the rate at which material is received by the passage. Such geometries assure complete filling of the receiving passages and accordingly provide a uniform rate of discharge and uniform discharge pressure for material processed in the processor.

Serious complications however have developed in multi-stage rotary processors in which a different geometry is required for passages receiving material from a passage(s) of another stage. For example, certain polymeric processes require a passage geometry which provides the passage with the capability to process and discharge material at a volume rate greater than the rate at which material is received by the passage. This variance or mismatch between the rate at which the passage receives material and the volumetric/rate capability of the passage to process and discharge material can cause seriously large pressure, flow and temperature fluctuations particularly at the discharge of the rotary processor.

This invention is directed to multi-passage rotary processors having a novel, improved design which provides special advantages in terms of efficiency, quality of product and overall processing performance characteristics.

BRIEF SUMMARY OF THE INVENTION

The rotary processors of this invention comprise a rotatable element carrying at least two annular channels and a stationary element providing a coaxial closure surface operationally arranged with the channels to provide enclosed processing passages. Each processing passage has an inlet, outlet and a channel blocking member associated with the stationary element and arranged and adapted so that material fed to the inlet can be carried forward by the rotatable channel walls to the blocking member for discharge from the passage. Material transfer grooves are formed in the coaxial surface of the stationary element to provide means to transfer material between the processing passages.

One or more of the passages are first processing passages operating in parallel and having geometries selected to optimize the efficiency of the processing function assigned the passage(s). A further processing passage is arranged outboard of the first processing passage(s) and operates in series with it (them). The geometry of the further processing passage is selected to provide the passage with a capability to process and discharge material at a volume rate greater than the rate at which material is supplied to the passage. A material transfer groove located near and communicating with the outlet(s) of the first processing passage(s) and the inlet of the further processing passage transfers material from the first processing passage(s) to the further processing passage. Adjustable material transfer rate control means are arranged in the further processing passage and provide the passage with an effective capability for selectively adjusting the processing rate of the passage to coordinate the adjusted rate to the rate at which material is supplied to the passage.

Details relating to the novel multi-passage rotary processors of this invention as well as the advantages derived from such processors will be more fully appreciated from the Detailed Description of the Preferred Embodiments taken in connection with the Drawings.

BRIEF DESCRIPTION OF THE DRAWINGS

The invention will be described in connection with the attached drawings in which.

DETAILED DESCRIPTION OF THE PREFERRED EMBODIMENT

Figure 1:
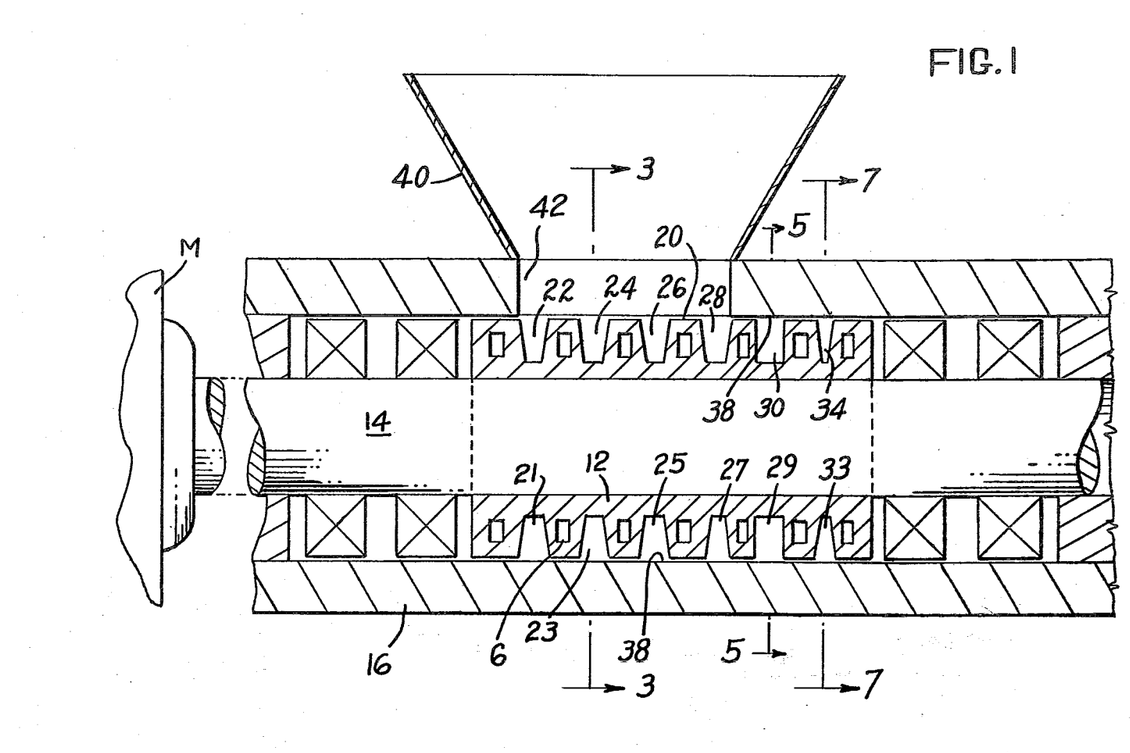
FIG. 1 is a cross-sectional view of a multi-passage rotary processor of this invention showing an arrangement of processing passages.

Referring first to FIG. 1, novel, multi-passage rotary processors of this invention include a rotatable element comprising a rotor 12 mounted on a drive shaft 14 for rotation within a stationary element comprising a housing 16. Rotor 12 carries a plurality of processing channels 21, 23, 25, 27, 29 and 33 each having opposed side walls extending inwardly from rotor surface 20. Means for rotating rotor 12 are shown as M since such means are of any suitable type commonly used for rotating extruders or similar polymeric processing apparatus and are well known to those in the art. Housing 16 of the stationary element provides a coaxial closure surface 38 cooperatively arranged with surface 20 of rotor 12 to form with channels 21, 23, 25, 27, 29 and 33 enclosed processing passages 22, 24, 26, 28, 30 and 34 respectively.

Multi-stage rotary processors of this invention can provide a variety of combinations of processing stages. Normally, the first stage involves a plasticating operation designed to melt, soften or otherwise increase the flowability of material fed to the processor. The second stage performs a compounding operation which can involve mixing, homogenizing or devolatilizing material processed in the first stage or adding ingredients to or removing ingredients from first-stage processed material. The third stage is normally assigned a pressurizing or pumping function to discharge second-stage processed material from the processor. For illustrative purposes, the multi-stage rotary processor described hereafter includes a first stage for melting—or at least partially melting—polymeric material, a second stage for mixing first-stage processed polymeric material and a third stage for discharging the first- and second-stage processed material from the processor.

Referring again to FIG. 1, the processing passages shown are arranged and designed to provide a plurality of processing stages. Processing passages 22, 24, 26 and 28 provide the first stage. The second stage includes at least one further processing passage, shown as passage 30. The third stage is provided by passage 34 positioned outboard of the first two stages. As will be explained in detail later, the stages are interconnected by material transfer grooves formed in closure surface 38 and arranged so that material processed in one stage can be transferred to another.

Figures 2, 3:
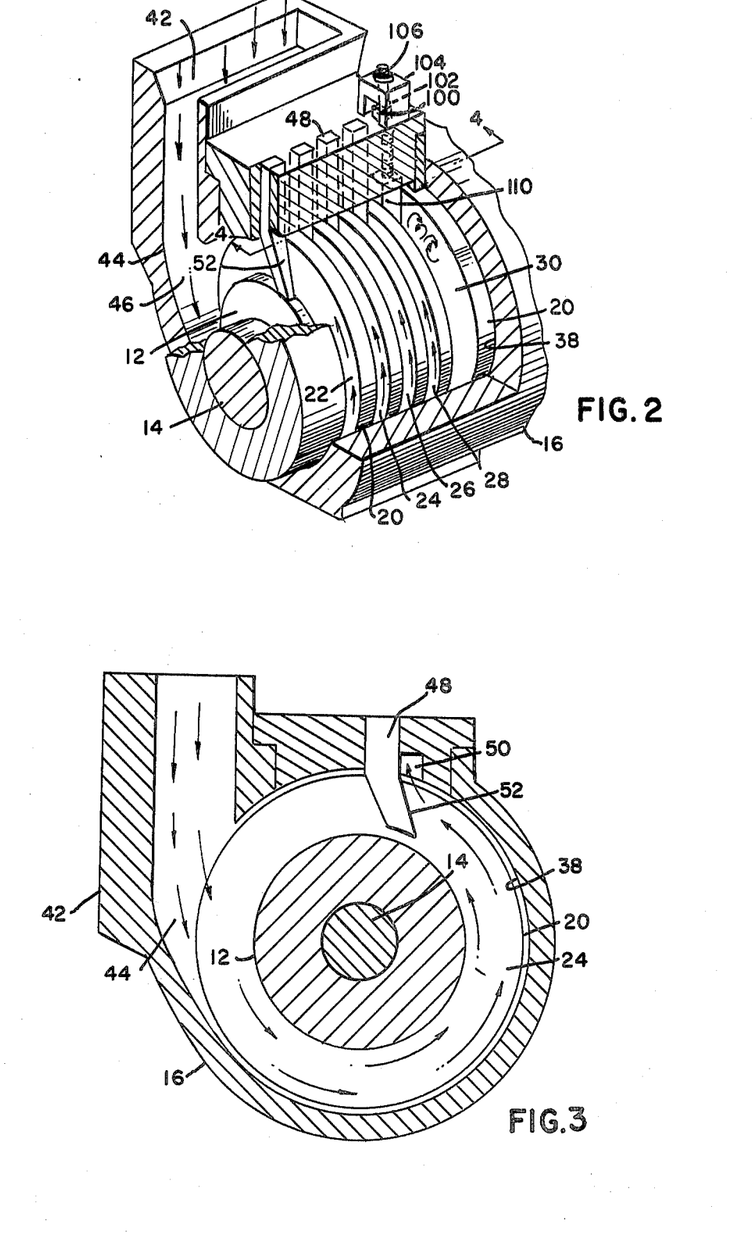
FIG. 2 is a perspective view of a rotary processor of the invention which is partly in section with parts broken away.
FIG. 3 is a simplified cross-sectional view of a first processing passage of the processor of FIG. 1 taken along line 3—3 of FIG. 1.

Referring now to FIGS. 2 and 3, material such as plasticated or unplasticated material is suitably fed to the multi-stage rotary processor from a hopper 40 communicating with inlet 42. As shown in FIGS. 2 and 3, coaxial surace 38 of housing 16 is cylindrical over most of its extent, but is provided with undercuts 44 extending over the portions of channels 21, 23, 25 and 27 and adjacent inlet 42. Undercuts 44 have a width such that their sidewalls 46 extend out over cylindrical portions 20 of rotor 12 to form intake chambers designed to aid feeding of polymeric solids into each passage of the first stage.

In operation, material is supplied gravitationally or through the use of force feeders to the processor through inlet 42 and, is aided by undercuts 44 into channels 21, 23, 25 and 27. The situation is shown in FIG. 2 and FIG. 3. FIG. 2 illustrates a section of rotor 12 carrying channels 21, 23, 25 and 27 of the first-stage processing passages and channel 29 of the first passage of the second stage. FIG. 3 illustrates passage 24 of the first stage which has the same dimensions and arrangement of structural elements as first-stage passages 22, 26 and 28. Each processing passage of the first stage includes a channel blocking member 48 arranged near material transfer groove 50 which is arranged to communicate with each first-stage passage. Transfer groove 50 is normally spaced apart from inlet 42 a major portion of the circumferential distance about the processing passage.

As shown in FIGS. 2 and 3, each blocking member 48 provides a material blocking and material collecting end wall surface 52 for each passage of the first stage. Accordingly in operation, movement of the main body of material fed to each first-stage passage is blocked and relative movement is established between the moving channel walls and the blocked material. The so-established relative movement generates frictional heat at the moving walls and within the body of material. Additionally, the channel walls of the first stage processing passages—and preferably all of the channel walls of the processor—are normally heated such as by a heat transfer fluid supplied in known manners to chambers 6 (FIG. 1). Details relating to suitable heating means can be found in referenced U.S. Pat. Nos. 4,142,805 and 4,194,841.

Normally, the action of the channel walls in dragging material forward builds up pressure progressively about the passage and maximum pressure in each of the first stage processing passages is usually reached at surface 52 of blocking member 48. Surface 52 of each first-stage processing passage is shaped and dimensioned or otherwise adapted to block and collect the material for discharge from the passage.

The first stage illustrated in the Figures has four processing passages of substantially identical shape and dimensions. More or fewer passages may be used and first-stage passages differing in shape, dimensions and geometry from other first-stage passages may also be used.

Figure 4:
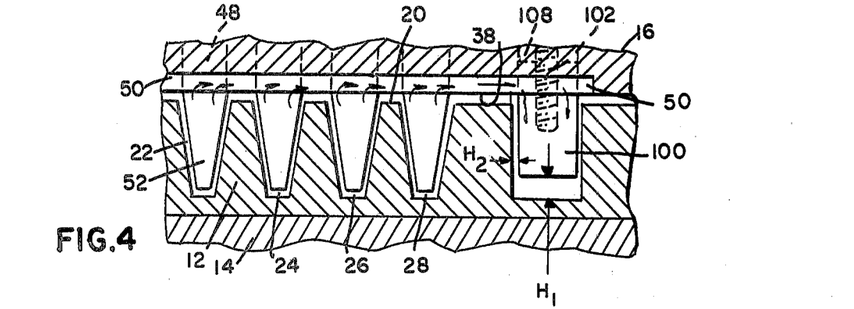
FIG. 4 is a simplified cross-sectional view of the rotary processor illustrated in FIG. 2 taken along line 4—4 of FIG. 2.

Material processed in the first stage is discharged from each passage through material transfer groove 50 (FIGS. 2 and 3). Transfer groove 50 is formed in coaxial surface 38 adjacent to and upstream of surface 52 of blocking member 48. Transfer groove 50 extends parallel to the axis of rotor 12 with the open end of groove 50 disposed to receive processed material collected at surface 52 of each passage and to convey the received material over surfaces 20 of the first-stage passages for discharge to the second-stage processing passage 30. As shown in FIGS. 2 and 4, the most outboard terminal portion of groove 50 provides an inlet for passage 30.

The second processing stage includes at least one processing passage shown in the illustrated processor as passage 30. As shown in FIG. 4, material from the processing passages of the first stage is discharged to the first passage 30 of the second stage through transfer groove 50.

As mentioned, second-stage processing passages are designed to perform compounding operations on first-stage processed material. In the illustrated processor, the second stage is designed to efficiently mix melted or partially melted material supplied from the first stage. A processing passage assigned the function of providing efficient mixing of viscous material requires a different geometry from the geometry of the first-stage polymer melting passages. For optimum operation, mixing passages are designed with a wide channel to provide sufficient back-flow for efficient mixing at low pressure and with minimum temperature increase. As shown in FIG. 1, for example, passage 30 of the second stage has parallel walls and is wider than the passages of the first stage. This difference in geometry establishes a variance between the rate at which first stage processed material is supplied to the second stage passage and the capacity of the second stage passage.

The effect of this variance can be best appreciated by illustrating the differences which can exist between the rate of supply of first-stage processed material and the processing and discharge capacity of a second-stage passage having a geometry selected to provide efficient mixing. As mentioned, an illustrative multi-stage rotary processor of this invention can include a first stage having four passages operating in parallel and providing a total first-stage processing volume of about 300 cubic inches. Such processors can be operated at a speed ranging between 50 to 150 RPM. Under such conditions, the rate of supplying melted material to the second-stage passage can range between 400 lbs/hr to 2600 lbs/hr depending on channel wall speeds and polymer properties. However, a relatively wide second-stage mixing passage is required for efficient mixing and a second-stage mixing passage of such geometry can process and discharge material at a rate between 7500 to 22,500 lbs/hr at speeds between 50 to 150 RPM.

This large variance or disparity between the rate at which the first stage supplies melted material to the material transfer groove and the processing and discharge capacity of the second-stage provides interruptions in the flow of melted material within second-stage passages and in passages of further processing stages with resultant severe surges and fluctuations in flow, pressure and temperature throughout the processing passages and particularly at the discharge region of the processor. Additional details relating to the above-discussed variance established by selected geometries of interconnected multi-stage processor passages can be found in commonly assigned, copending U.S. Patent Application Ser. No. 336,936 filed concurrently with this Application by L. N. Valsamis and Z. Tadmor.

The present invention presents novel, improved rotary processors which include means which provide an effective capability for improving the processing efficiency of rotary processors which include processing passages presenting this variance. In accordance with the present invention, a novel material transfer rate control means is arranged near the inlet region of passage 30 (FIGS. 2, 4, 5 and 6). Material transfer rate control means involves an adjustable member 100 arranged and adapted to extend radially into channel 29 for blocking a portion of the channel. Adjustable member 100 provides the passage with the capability for selectively adjusting the processing rate of the passage to coordinate the adjusted rate with the rate at which material passing through transfer groove 50 is supplied to passage 30. The degree of adjustment is directly related to the degree of rate coordination required to provide the desired processing conditions within passage 30 and to maintain these conditions during operation.

Adjustable member 100 is shown in FIGS. 2, 4, 5 and 6 as a throttling pin passing through an opening 108 in the housing 16 and extending radially into channel 29. The position of member 100 is determined by its relationship with the adjusting screw 102, locking nut 106, and positioning means 104, which are suitably arranged to adjust and hold member 100 at any desired depth in channel 29 before or during operation of the processor. The adjustability of the throttling pin provides control during operation of the size of the opening bounded by the root of channel 29 and the bottom of throttling pin 100. This opening is shown as $H_1$ in FIGS. 4 and 5.

Figures 5, 7:
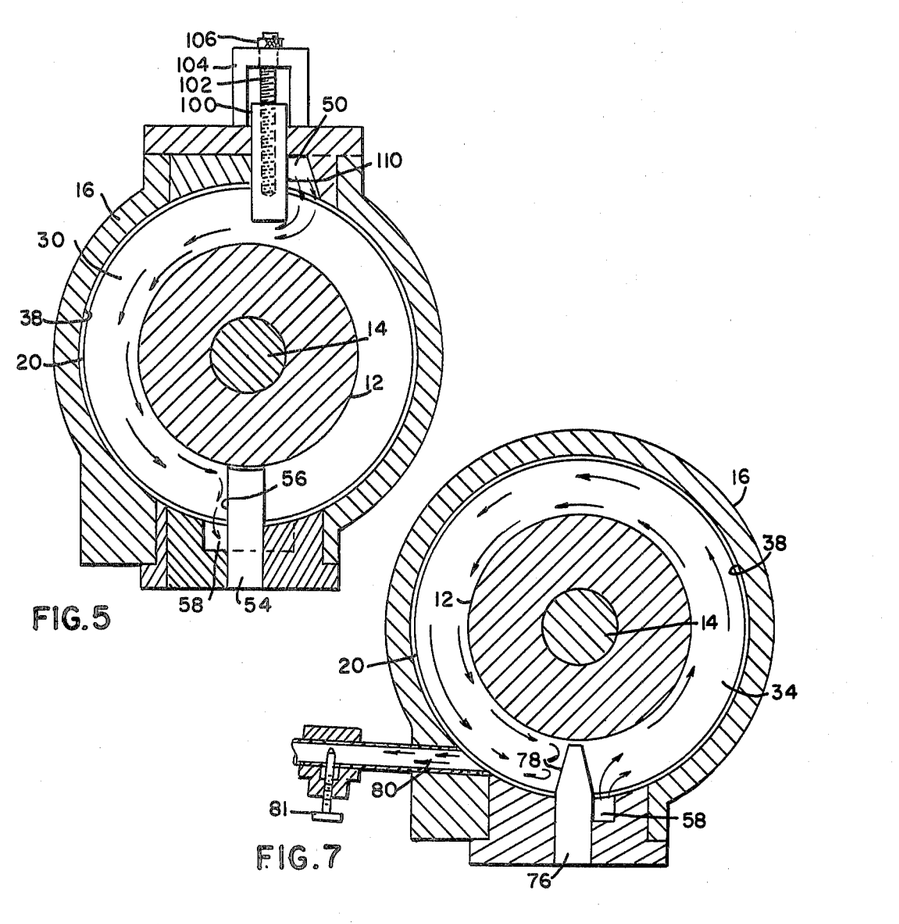
FIG. 5 is a simplified cross-sectional view of a further processing passage of the processor of FIG. 1 taken along line 5—5 of FIG. 1.
FIG. 7 is a simplified cross-sectional view of a final processing passage of the processor of FIG. 1 taken along line 7—7 of FIG. 1.

As shown in FIG. 5, member 100 is adjusted to provide an $H_1$ which decreases the processing rate in passage 30 to an extent that a pool of melted material can be built up behind pin 100 at surface 110. A vigorous recirculating flow pattern can be created in this pool to increase viscous shear and provide intensive mixing and efficient melting of material in the pool. The provision of a circulating pool of material at surface 110 is an important feature of the invention providing improved quality of processed product. For example, higher temperatures are required to completely melt material processed in the first stage and the temperature of melt stage material is further increased in the subsequent mixing and pressurizing stages. In some operations, unacceptably high discharge material temperatures have been observed e.g., temperatures in the order of 500° F. for some materials processed in the rotary processors. The melt pool feature shown in FIG. 5 permits the use of lower melt stage operational temperatures. Accordingly, material supplied to the second stage passages is at a lower temperature and is not completely melted and may contain unmelted or partially melted material. Melting of such supplied material can then be completed in the pool of material collected at surface 110 before the material passes through opening $H_1$. This feature provides efficient processing at lower operational temperatures thereby minimizing degradation and providing a melt product of improved quality.

Figure 6:
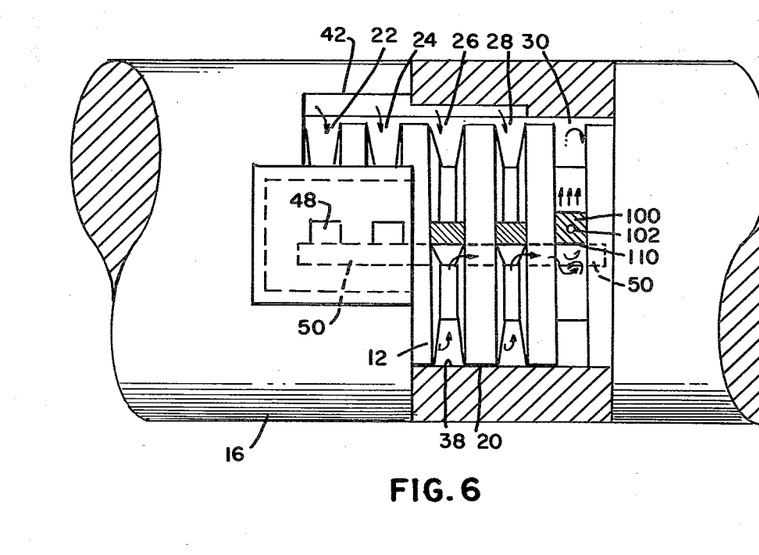
FIG. 6 is a top view of a portion of the rotary processor illustrated in FIG. 2 which is partly in section with parts broken away.

In FIG. 6, adjustable member 100 is shown with a rectangular cross-section. Member 100 may alternatively be designed in a cylindrical or wedge shape, or a shape selected to accomplish any desired additional processing.

Referring again to FIGS. 1, 2 and 4, material processed in the first stage is transferred by way of groove 50 to the first passage of the second-stage. As shown (FIG. 1), the geometry of the first passage provides the variance described before. The first-stage processed material is efficiently mixed in passage 30 (FIG. 5) by the relative movement established between material blocked by throttling pin 100 and the moving channel walls which drag or carry the material forward through opening $H_1$ and by the relative movement established between material blocked by blocking member 54 and the moving channel walls which drag or carry the material forward to the material collecting and material blocking end wall surface 56. In the illustrated multistage processor, the blocking member 54 of passage 30 (FIG. 5) is arranged about 180 degrees from the circumferential position of the blocking members 48 of the first stage. Accordingly, in passage 30, material travels only approximately one-half a revolution through the passage before reaching blocking member 54.

The second stage illustrated and described includes only one passage 30. This preferred illustrated arrangement can be varied. For example, the second stage can involve two or more passages arranged in parallel or in series, and the shape, dimensions and geometry of the passages can be the same or different.

Referring to FIGS. 5 and 7, material processed in the second stage is transferred to a processing passage of the third stage through material transfer groove 58. Transfer groove 58 is formed in coaxial surface 38 and has an open end extending parallel to the axis of rotor 12 in the region of passage 30 upstream of surface 56, then transversely to the axis of rotor 12 across the portion of rotor surface 20 between channels 29 and 33, and then parallel to the axis of rotor 12 in the region of passage 34 downstream of surface 78.

As described in referenced U.S. Pat. No. 4,227,816, the transfer groove 58 can be formed in removable flow director units which can be mounted in slots in housing 16 arranged to permit cooperation of the transfer grooves with selected passages. Blocking members and pins can also be carried by the removable flow director units.

The third-stage passage, e.g. passage 34 (FIGS. 1 and 7), is primarily designed to function as a pressurizing or pumping stage for material supplied from the passage(s) of the second stage. Accordingly, the geometry of the passage is selected to provide a passage having a capacity which remains at least partially filled at all times during operation and which is capable of generating high discharge pressures. As shown in FIG. 7, material supplied to the third-stage processing passage is dragged forward by the walls of channel 34 to blocking member 76. Material collected at surface 78 is discharged from the processor through outlet 80. Discharge control means, shown as throttling valve 81 in FIG. 7, are included to control the discharge pressure and/or rate of material processed in third-stage passage 34.

FIGS. 1 and 7 show a third-stage processing section consisting of one passage, but more than one passage may be used. The passages may be connected in parallel or in series. For example, a plurality of third-stage processing passages may be interconnected so that material can be transferred from one third-stage processing passage to another for discharge from the processor. Alternatively, a plurality of third-stage processing passages can be interconnected so that material is fed to each passage and discharged from the processor from each passage.

Multi-passage processors of this invention present highly efficient polymeric processors providing special operational and design advantages. A multi-stage processor as described and illustrated presents such advantages as compact size, low power consumption and high production potential for efficiently melting, mixing and discharging a polymer melt product of uniformly high quality at substantially constant rate and pressure.

EXAMPLE

A multi-stage rotary processor of the type described with reference to FIGS. 1-7, has been employed to process low density polyethylene. The processor included a rotor having an OD of 14.0 inches which carried an arrangement of processing passages as shown in FIG. 1 interconnected by material transfer grooves. The material transfer grooves were formed in the coaxial surface of the stationary housing in substantially the same arrangements shown in FIGS. 2, 4, 5 and 7.

The first-stage passages of the processor included four wedge-shaped channels as shown in FIGS. 1-4. Each channel has a maximum width of 1.0 inches, a minimum width of 0.65 inches and a height of 2.45 inches. The distance between channels at rotor surface 20 was 1.0 inches. The second-stage passage included one channel of rectangular cross-section having a width of 1.0 inches and a height of 2.45 inches. The blocking member 54 was arranged about 180° from the circumferential position of first-stage blocking members 48. The third-stage processing passage included one wedge-shaped channel having a maximum width of 0.25 inches, a minimum width of 0.162 inches, and a height of 2.45 inches.

When processing low density polyethylene, the processing rate of the first stage was determined to be 400 lbs/hr at a rotor speed of 50 RPM. Assuming that no pressure is built up in the passage, the processing rate capability of the second-stage passage at the same rotor speed can be calculated by using the following equation:

$$Q_D = N \pi R_D^2 (1 - \alpha^2) H$$

Where
$Q_D$ = flow rate, in$^3$/sec.
N = rotor speed, rotations/sec.,
$R_D$ = outside rotor radius, inches,
$\alpha = R_S/R_D$,
$R_S$ = radius of root of chamber, inches,
H = channel width, inches.
For the second-stage passage of this example:
N = 50 RPM = 0.833 rotations/sec.,
$R_D = \frac{1}{2}OD = 7.0$ inches,
$R_S = R_D$ − channel depth = 4.55 inches,
$\alpha = 0.65$,
H = 1.0 inches.

Using equation (1), the flow rate $Q_D$ is calculated to be 74.05 in$^3$/sec. Assuming a melted material density of 50 lb/ft$^3$, the processing rate capability is determined to be 7,714 lb/hr.

The above demonstrates the severity of the variance or disparity which can exist between the rate (400 lbs/hr) at which the first stage supplied melted material and the processing rate capability of the second stage passage (7,714 lbs/hr). Such a variance inherently provides interruptions in the flow of melted material within the second stage passages and in processing passages receiving material from the second stage passages. The interruptions provide a non-uniform, erratic flow rate characterized by severe fluctuations in the quality, temperature and pressure of processed material particularly at the discharge of the processor.

Figure 8:
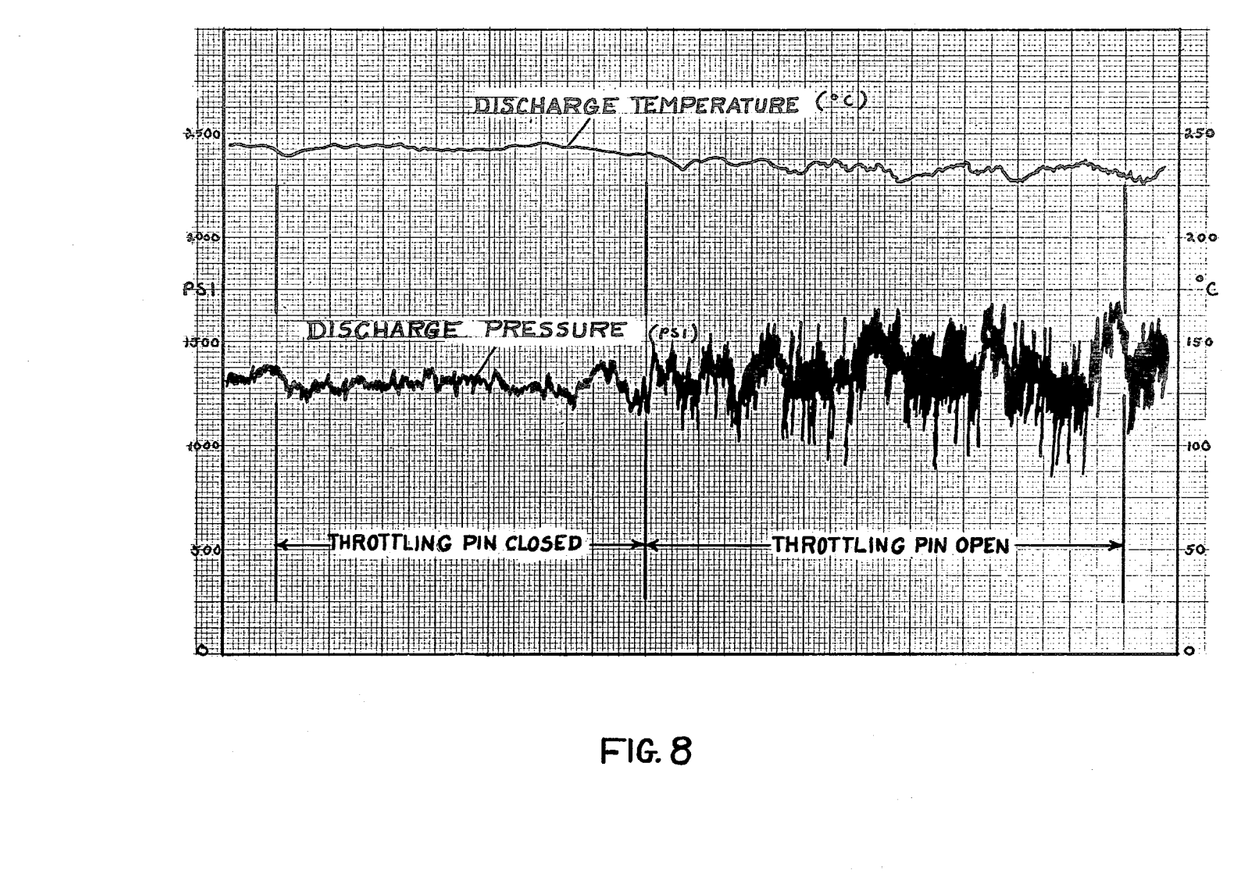
FIG. 8 is a tracing of actual data plotted by a strip chart recorder during testing of an improved rotary processor of this invention.

The fluctuations or surges in exit temperature and pressure are dramatically illustrated in FIG. 8, which is a tracing of actual data plotted by a strip chart recorder during a direct comparison of rotary processors operating under substantially the same conditions. Low density polyethylene was fed to the first stage of the multistage processor described in the above example at a rate of 400 lbs/hr with a rotor speed of 50 RPM. The right-hand portion records temperatures (upper line) and pressures (lower line) when the processor was operated for 15 minutes without the adjustable transfer rate control means of this invention. During operation, the discharge valve was adjusted to provide an average discharge pressure of about 1260 psi. The average discharge rate was 400 lbs/hr. As shown, the discharge pressure fluctuates from below 1000 psi to over 1600 psi and the discharge temperature fluctuates from about 225° F. to nearly 240° F.

The same processor which provided the tracings on the right side of FIG. 8 was then altered in accordance with the invention. A throttling pin was arranged substantially as shown in FIGS. 2, 4, 5 and 6 near the inlet region of the second-stage mixing passage, to extend radially into the channel of the second stage processing passage for blocking a portion of the channel. The throttling pin was adjusted to provide an opening $H_1$ of 0.32 inches. The pin was rectangular in cross-section, with side clearances $H_2$ between the pin and the channel walls of 0.005 inches. The feed material, feed rate and rotor speed remained the same. The discharge valve was again adjusted to provide an average discharge pressure of about 1260 psi. The average discharge rate was again 400 lbs/hr. The left-hand portion of FIG. 8 shows the pressures (lower line) and temperatures (upper line) recorded when the processor was operated with the above-described throttling pin at the inlet to the second stage. As shown, the discharge pressure is between about 1200 psi and about 1400 psi and the discharge temperature is between about 240° F. and about 245° F.

From the above Example, it is apparent that the novel multi-passage rotary processors of this invention provide distinctive and unexpected advantages over rotary processors previously known to the art at the time this invention was made. Essentially, the practice of the invention permits effective utilization of combinations of processing passages having geometries presenting a variance which can cause pressure, temperature and flow rate fluctuations. Accordingly, the invention effectively expands the adaptability and efficiency of rotary processors particularly in terms of the processing operations performed by multi-stage rotary processors. Other multi-stage rotary processors in which this invention can be used are described in commonly assigned, copending U.S. Patent Applications Ser. Nos. 336,607 and 336,936 filed on the same day as this Application by L. N. Valsamis, J. C. Yang and G. Donoian and by L. N. Valsamis and Z. Tadmor respectively.

We claim:

1. A multi-stage rotary processor comprising a rotatable element carrying a plurality of processing channels and a stationary element having a coaxial closure surface operationally arranged with said channels to provide enclosed first- and second-stage processing passages, each processing passage having an inlet, an outlet and a channel blocking member associated with the stationary element and arranged so that material fed to the inlet can be carried forward by the channel walls to the blocking member for discharge through the outlet, and where one or more of the first-stage processing passages are adapted to transfer material to a second-stage processing passage; and where the geometry of said one or more first-stage processing passages relative to the geometry of said second-stage processing passage is such that said one or more first-stage processing passages are capable of processing and transferring material to the second-stage processing passage at a volumetric rate which is less than the rate at which said second-stage processing passage is capable of receiving and processing the transferred material, so that the differential between the rate at which material is supplied by the first stage to the second-stage processing passage and the rate at which the supplied material can be received and processed by the second-stage processing passage can cause fluctuations of flow of material through the second-stage processing passage and through any further processing passages receiving material from the second-stage processing passage; and where said processor includes adjustable means positioned near the inlet of the second-stage processing passage and arranged and adapted for extension into the passage channel for blocking a portion of the channel to thereby provide the second-stage processing passage with the capability for selectively adjusting the receiving and processing rate of the passage to coordinate the adjusted rate with the rate at which material is supplied from said one or more first-stage processing passages to provide substantially uniform flow of material through the second-stage processing passage and to maintain said substantially uniform flow through the passage during operation.

2. A processor of claim 1 including a material transfer groove formed in the closure surface and arranged and adapted to transfer material from the one or more first-stage processing passages to the second-stage processing passage.

3. A processor of claim 1 where said adjustable means includes a throttling member.

4. A processor of claim 3 where said throttling member is radially adjustable relative to said second-stage processing passage.

5. A processor of claim 4, in which said throttling member comprises:

(a) a throttling pin which extends radially into said second stage processing passage and is of dimensions to allow complete or nearly complete blocking of the passage, and which can be shaped to accomplish any desired additional processing;

(b) positioning means associated with said closure surface of said stationary element, sad positioning means being of internal dimensions to allow substantially complete withdrawal of said throttling pin from said further processing passage and being shaped complementarily to said throttling pin to resist deflection of said pin in the direction of rotation of said rotatable element, and having a bore in its radially outwardly facing surface; and (c) an adjusting screw designed to cooperate with said throttling pin and said bore to move said throttling pin radially into and out of said further processing passage and to position said pin to provide the required degree of adjustment of the receiving and processing rate in the passage.

6. A multi-stage rotary processor comprising a rotatable element carrying a plurality of processing channels and a stationary element having a coaxial closure surface operationally arranged with said channels to provide enclosed processing passages, each processing passage having an inlet, an outlet and a channel blocking member associated with the stationary element and arranged so that material fed to the inlet can be carried forward by the channel walls to the blocking member for discharge through the outlet, and where the processing passages provide a plurality of interconnected processing stages including a first processing stage having one or more processing passages, a second processing stage having at least one passage adapted to receive material from the one or more first-stage processing passages, and a third processing stage adjacent to and outboard of the second processing stage and including at least one passage adapted to receive material from a second-stage processing passage and capable of developing discharge pressures for discharge of material from the processor; and where the geometry of said one or more first-stage processing passages relative to the geometry of said second-stage processing passage receiving first-stage processed material is such that said one or more first-stage processing passages are capable of processing and transferring material to the second-stage processing passage at a volumetric rate which is less than the rate at which the second-stage processing passage is capable of receiving and processing the transferred material, so that the differential between the rate at which material is supplied by the first stage to the second-stage processing passage and the rate at which the supplied material can be received and processed by the second-stage processing passage can cause fluctuations of flow of material through the second- and third-stage processing passages; and where said processor includes adjustable means positioned near the inlet of the second-stage processing passage and arranged for extension into the passage channel for blocking a portion of the channel to thereby provide the second-stage processing passage with the capability for selectively adjusting the receiving and processing rate of the passage to coordinate the adjusted rate with the rate at which material is supplied from said one or more first-stage processing passages to provide substantially uniform flow of material through the second and third-stage processing passages and to maintain said substantially uniform flow through the passages during operation.

7. A processor of claim 1 or claim 6 including means to heat at least the one or more first-stage processing passages.

8. A processor of claim 1 or claim 6 where the one or more first-stage processing passages are formed with wedge-shaped channels.

9. A processor of claim 1 or claim 6 where the blocking member of the second-stage processing passage is disposed about 180° from the circumferential position of the blocking members of the one or more first-stage processing passages.

10. A processor of claim 6 including discharge control means to provide control of the discharge pressure in the third stage.

11. A processor of claim 6 where the second-stage includes more than one passage.

12. A processor of claim 6 where the third-stage includes more than one passage.

* * * * *